United States Patent
Chen et al.

(10) Patent No.: US 12,551,676 B2
(45) Date of Patent: Feb. 17, 2026

(54) MICRONEEDLE DEVICE

(71) Applicant: DARWIN PRECISIONS CORPORATION, Hsinchu County (TW)

(72) Inventors: Wen-Chuan Chen, Hsinchu County (TW); Cheng-Hsiung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/809,379

(22) Filed: Aug. 20, 2024

(65) Prior Publication Data

US 2025/0128036 A1   Apr. 24, 2025

(30) Foreign Application Priority Data

Oct. 19, 2023   (TW) .................................. 112140050

(51) Int. Cl.
*A61M 37/00*   (2006.01)

(52) U.S. Cl.
CPC . *A61M 37/0015* (2013.01); *A61M 2037/0023* (2013.01); *A61M 2037/0046* (2013.01)

(58) Field of Classification Search
CPC ...... A61M 2037/0023; A61M 37/0015; A61M 2037/0053; A61M 2037/0046; A61M 2037/0061; A61K 9/0021; B29C 59/002; B29L 2031/756

See application file for complete search history.

(56) References Cited

U.S. PATENT DOCUMENTS

| | | | | |
|---|---|---|---|---|
| 2003/0045837 A1* | 3/2003 | Delmore | .......... | A61B 5/150984 604/173 |
| 2024/0350784 A1* | 10/2024 | Yang | ................. | A61M 37/0015 |

FOREIGN PATENT DOCUMENTS

| | | | | | |
|---|---|---|---|---|---|
| CN | 106535980 | A | * | 3/2017 | ........ A61M 37/0015 |
| CN | 108956737 | A | | 12/2018 | |
| CN | 215916209 | U | * | 3/2022 | ............ A61M 37/00 |
| CN | 115697209 | A | | 2/2023 | |
| JP | 2017074196 | A | * | 4/2017 | ............ A61M 37/00 |
| JP | 2021007449 | A | * | 1/2021 | ............ A61M 37/00 |
| TW | I721249 | B | | 3/2021 | |
| WO | WO-2014107138 | A1 | * | 7/2014 | ........ A61M 37/0015 |
| WO | WO-2017006958 | A1 | * | 1/2017 | ........... A61K 9/0021 |

OTHER PUBLICATIONS

CN 215916209 U, English language machine translation (Year: 2022).*

* cited by examiner

*Primary Examiner* — Wesley G Harris

(57) ABSTRACT

A microneedle device includes a substrate and a plurality of microneedle structures. The substrate is provided with a first surface, where the first surface has a surface roughness ranged from 0.05 μm to 2.0 μm. The plurality of microneedle structures are configured on the first surface. Because the surface of the microneedle device has a surface roughness of 0.05 μm to 2.0 μm, a film can be formed completely.

7 Claims, 4 Drawing Sheets

MICRONEEDLE DEVICE

FIELD OF THE INVENTION

The present invention relates to a microneedle device.

BACKGROUND OF THE INVENTION

Common drug delivery modes include oral administration, subcutaneous injection, and transcutaneous delivery. Through transcutaneous delivery, drugs absorbed by the skin enter the blood circulation system, so compared with oral administration and subcutaneous injection, transcutaneous delivery can make a drug concentration in the blood more stable and can avoid a painful sensation during injection and a wound infection risk. In the transcutaneous delivery mode, a microneedle patch is popular because of the following advantages: a fine needle on the microneedle patch is very short and will not cause a painful sensation during use, and the fine needle can carry macromolecular drugs to pass through the cuticle to enter a human body so that the drug delivery efficiency is improved.

A common mode of manufacturing the microneedle patch includes the following steps: first, manufacturing a mold core with a microneedle structure; then rolling over the mold core with polydimethylsiloxane (PDMS) to manufacture a PDMS master mold; then pouring a liquid containing a macromolecular material (hereinafter referred to as a liquid) into the PDMS master mold; and completing airing to form the microneedle patch. However, known microneedle patches usually have the problem that the films are incomplete.

SUMMARY OF THE INVENTION

The present invention provides a microneedle device capable of forming a film completely for a microneedle patch.

The microneedle device provided by the present invention includes a substrate and a plurality of microneedle structures. The substrate is provided with a first surface, where the first surface has a surface roughness ranged from 0.05 µm to 2.0 µm. The plurality of microneedle structures are configured on the first surface.

In an embodiment of the present invention, the first surface is provided with a first texture; the first texture includes a plurality of first patterns, and each of the first patterns encircles each of the microneedle structures.

In an embodiment of the present invention, each of the first patterns is provided with a plurality of circles; each of the circles has a center of a circle; the centers of circles are arranged along a circular trace encircling each of the microneedle structures; and adjacent circles are overlapped with each other.

In an embodiment of the present invention, there are gaps ranged from 0.01 mm to 0.2 mm between the centers of circles of the adjacent circles.

In an embodiment of the present invention, each of the microneedle structures is provided with a second needle-like surface, and the second surface has a surface roughness ranged from 0.05 µm to 2.0 µm.

In an embodiment of the present invention, the second surface is provided with a second texture; the second texture comprises a plurality of curves; and the curves are arranged facing a direction away from the first surface from a side close to the first surface.

In an embodiment of the present invention, there are gaps ranged from 0.01 mm to 0.2 mm between the adjacent curves.

In an embodiment of the present invention, the second surface is provided with a second texture; the second texture is provided with a curve; and the curve encircles the second surface facing a direction away from the first surface from a side close to the first surface to form a spiral shape.

In an embodiment of the present invention, a material of the substrate and the microneedle structures comprises a metal.

In an embodiment of the present invention, a material of the substrate and the microneedle structures comprises a soluble macromolecular material.

According to the microneedle device provided by the present invention, because the surface of the microneedle device has the surface roughness of 0.05 µm to 2.0 µm, a film can be formed completely.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

In manufacturing modes of a microneedle patch, a mold core and the microneedle patch substantially have a same structure, for example, the mold core and the microneedle patch each are provided with a substrate and a microneedle structure configured on a surface of the substrate. The shape of the surface of the mold core provided with the microneedle structure will also be formed on the surface of the microneedle patch provided with the microneedle structure. In other words, characteristics of the surface of the mold core will be copied to the surface of the microneedle patch. The microneedle device provided by the present invention can be the mold core or the microneedle patch. The mold core will be described as an example first below.

Figure 1:
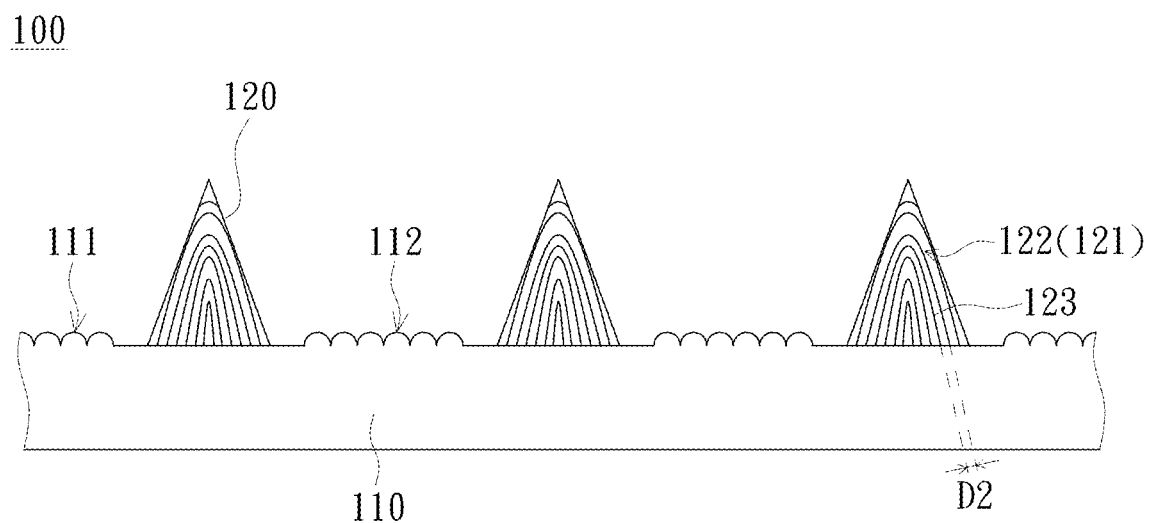
FIG. 1 is a schematic diagram of a side view of a microneedle device in an embodiment of the present invention.
Figure 2:
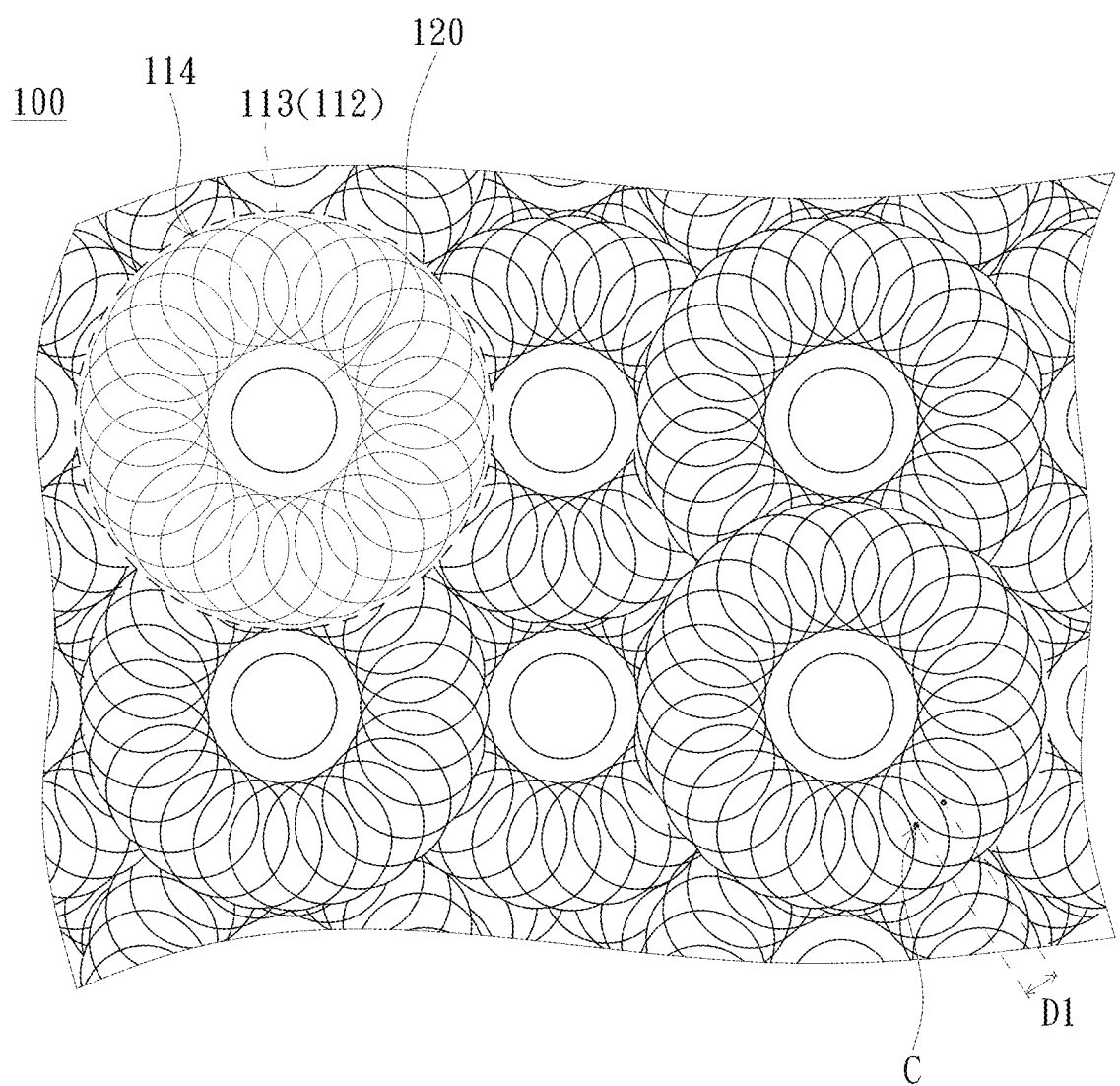
FIG. 2 is a schematic diagram of a top view of the microneedle device in an embodiment of the present invention.

FIG. 1 is a schematic diagram of a side view of a microneedle device in an embodiment of the present invention. FIG. 2 is a schematic diagram of a top view of the microneedle device in an embodiment of the present invention. Referring to FIG. 1 and FIG. 2, the microneedle device 100 in the embodiment includes a substrate 110 and a plurality of microneedle structures 120. The substrate 110 is provided with a first surface 111, where the first surface 111 has a surface roughness ranged from 0.05 µm to 2.0 µm. The plurality of microneedle structures 120 are configured on the first surface 111. The surface roughness ranges more preferably from 0.05 μm to 1.0 μm, and further more preferably from 0.05 μm to 0.5 μm, for example, 0.1 μm, 0.2 μm, 0.3 μm, 0.4 μm or 1.5 μm. However, the present invention is not limited thereto.

Continuously referring to FIG. 1 and FIG. 2, the first surface 111 of the microneedle device 100 in the embodiment is, for example, provided with a first texture 112. Through the first texture 112, the surface roughness of the first surface 111 ranges from 0.05 μm to 2.0 μm. Specifically speaking, the first texture 112 in the embodiment protrudes, for example, out of the first surface 111, but the present invention is not limited thereto. In another embodiment, the first texture 112 can be recessed into the first surface 111. The first texture 112 in the embodiment includes, for example, a plurality of first patterns 113; and each of the first patterns 113 encircles, for example, each of the microneedle structures 120, but the present invention has no specific limitations thereon. In another embodiment, the first texture 112 can include one first pattern 113; and the first pattern 113 encircles, for example, the plurality of microneedle structures 120.

To continue, each of the first patterns 113 in the embodiment is, for example, provided with a plurality of circles 114; each of the circles 114 has a center of a circle C; the plurality of centers of circles C are, for example, arranged along a circular trace encircling each of the microneedle structures 120; and the adjacent circles 114 are, for example, overlapped with each other. There are, for example, gaps D1 ranged from 0.01 mm to 0.2 mm between the centers of circles C of the adjacent circles 114. The gaps D1, for example, range from 0.01 mm to 0.1 mm preferably, and for example, 0.02 mm, 0.04 mm, 0.06 mm, or 0.08 mm. In addition, the diameter of each circle 114 of the first pattern 113 in the embodiment is, for example, the same, but the present invention has no specific limitations thereon.

In an embodiment where the microneedle device 100 is the mold core, a material of the substrate 110 and the microneedle structures 120 includes, for example, a metal, but the present invention has no specific limitations thereon. In addition, the plurality of microneedle structures 120 in the embodiment are, for example, in an array, but the present invention has no specific limitations on the arrangement mode of the microneedle structures 120 and also has no limitation on the quantity of the microneedle structures 120. The first pattern 113 of the first texture 112 in the embodiment is, for example, prepared by rotary cutting, but the present invention has no specific limitations thereon. In another embodiment, the first texture 112 can be manufactured in other processing modes. For example, electrical discharge machining, high-energy electron beams, electrochemical polishing, abrasive blasting, or etching are used. The first textures 112 formed in the different manufacturing modes are, for example, different. For example, the first textures 112 formed by electrical discharge machining and electrochemical polishing are, for example, powdery. The first texture 112 formed by the high-energy electron beams is, for example, in a fused state. The present invention has no specific limitations on the shape of the first texture 112.

Each of the microneedle structures 120 in the embodiment has, for example, a needle-like second surface 121. The second surface 121 has, for example, a surface roughness ranged from 0.05 μm to 2.0 μm, more preferably 0.05 μm to 1.0 μm and further more preferably 0.05 μm to 0.5 μm, for example, 0.1 μm, 0.2 μm, 0.3 μm, 0.4 μm or 1.5 μm, but the present invention has no specific limitations thereon. Because of the surface roughness of the second surface 121 of the microneedle device 100 in the embodiment ranged from 0.05 μm to 2.0 μm, the overall shape of the microneedle patch except the substrate is complete, and the microneedle structure is also complete in shape and is needle-like as well.

The second surface 121 in the embodiment is, for example, provided with a second texture 122. Through the second texture 122, the surface roughness of the second surface 121 ranges from 0.05 μm to 2.0 μm. The second texture 122 includes, for example, a plurality of curves 123, and the plurality of curves 123 are, for example, arranged facing a direction away from the first surface 111 from a side close to the first surface 111. Specifically speaking, the second texture 122 in the embodiment protrudes, for example, out of the second surface 121, but the present invention is not limited thereto. In another embodiment, the second texture 122 can, for example, be recessed into the second surface 121. The shape of each of the curves 123 in the embodiment is, for example, wavy, where a projection of one curve 123 on the first surface 111 is, for example, circular, but the present invention has no specific limitations thereon. In another embodiment, the shape of the curve 123 can be other shapes, and the plurality of curves 123 can, for example, be different. In the embodiment, the length of the curve 123 farther away from the first surface 111 is, for example, shorter, but the present invention has no specific limitations thereon. In addition, the plurality of curves 123 in the embodiment are, for example, not connected.

To continue, there are gaps D2, for example, ranged from 0.01 mm to 0.2 mm, between the adjacent plurality of curves 123 in the embodiment, more preferably ranged from 0.01 mm to 0.1 mm, for example, 0.02 mm, 0.04 mm, 0.06 mm or 0.08 mm, but the present invention has no specific limitations thereon. In an embodiment, the second texture 122 can be manufactured by machining, but the present invention is not limited thereto. In another embodiment, the second texture 122 can be manufactured in other processing modes. For example, electrical discharge machining, high-energy electron beams, electrochemical polishing, abrasive blasting or etching and the like are used.

Figure 3:
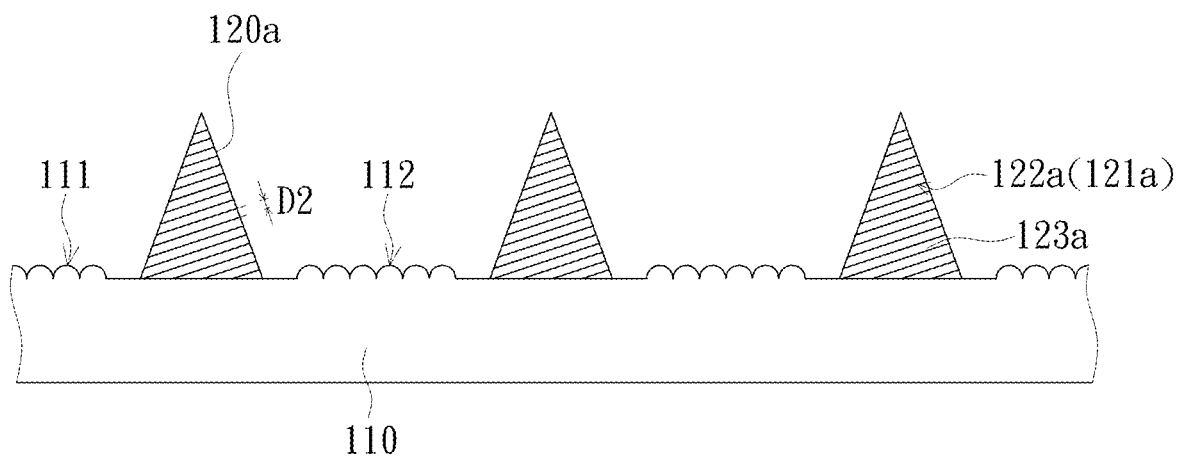
FIG. 3 is a schematic diagram of a side view of a microneedle device in another embodiment of the present invention.

FIG. 3 is a schematic diagram of a side view of a microneedle device in another embodiment of the present invention. Referring to FIG. 3, the microneedle device 100a in the embodiment is similar to the microneedle device 100, and the major difference lies in that a second texture 122a of the microneedle device 100a is different from the second texture 122 of the microneedle device 100. Specifically speaking, the second texture 122a in the embodiment is, for example, provided with a curve 123a. The curve 123a encircles, for example, the second surface 121a facing a direction away from the first surface 111 from a side close to the first surface 111 to form a spiral shape. The present invention has no specific limitations thereon.

A method for manufacturing the microneedle patch with the microneedle device 100 or 100a includes the following steps: rolling over the microneedle device 100 or 100a with polydimethylsiloxane (PDMS) to manufacture a PDMS master mold; and then pouring a liquid containing a macromolecular material (hereinafter referred to as a liquid) into the PDMS master mold; and completing airing to form the microneedle patch. Because the first surface 111 of the microneedle devices 100 and 100a has a surface roughness ranged from 0.05 μm to 2.0 μm, the film of the microneedle patch is formed completely after the microneedle patch formed by airing the liquid is peeled from the PDMS master mold, i.e., the overall shape of the substrate of the microneedle patch is complete without distortion.

Figure 4:
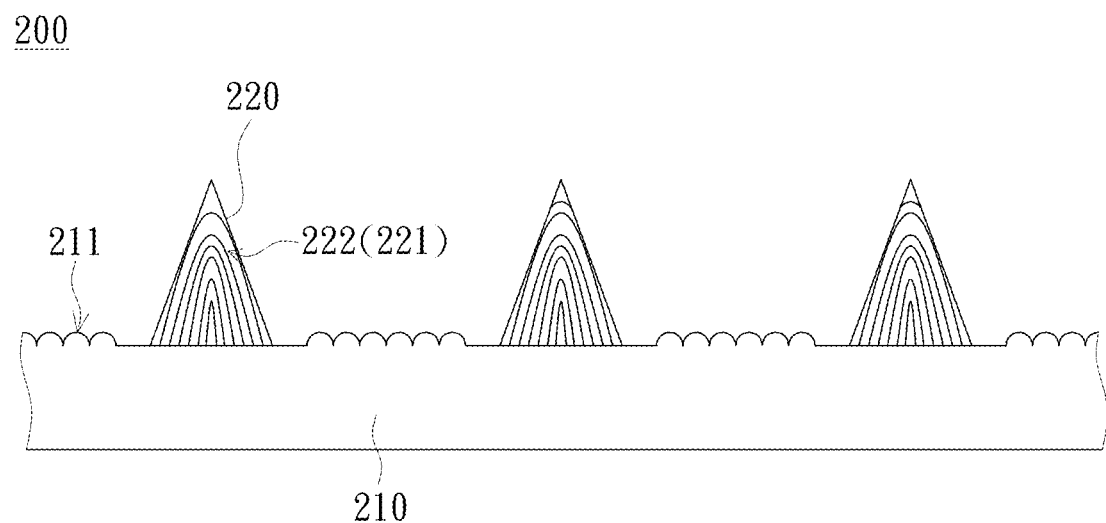
FIG. 4 is a schematic diagram of a side view of a microneedle device in another embodiment of the present invention.

FIG. 4 is a schematic diagram of a side view of a microneedle device in another embodiment of the present invention. Referring to FIG. 4, the microneedle device 200 in the embodiment is, for example, the microneedle patch manufactured by taking the microneedle device 100 as the mold core. A microneedle device 200 includes a substrate 210 and a plurality of microneedle structures 220. A material of the substrate 210 and the microneedle structures 220 includes, for example, a macromolecular material. The macromolecular material is, for example, a soluble macromolecular material. The microneedle device 200 is substantially as same as the microneedle device 100 in structure. Specifically speaking, the substrate 210 is provided with a first surface 211, where the first surface 211 has a surface roughness ranged from 0.05 μm to 2.0 μm. The plurality of microneedle structures 220 are configured on the first surface 211. The surface roughness ranges more preferably from 0.05 μm to 1.0 μm, and further more preferably from 0.05 μm to 0.5 μm, for example, 0.1 μm, 0.2 μm, 0.3 μm, 0.4 μm or 1.5 μm, but the present invention is not limited thereto. Based on the above manufacturing modes, the second texture 222 of the second surface 221 of the microneedle device 200 has, for example, the same characteristics as the second texture 122 of the second surface 121 of the microneedle device 100, which is not repeatedly described here. In addition, in the microneedle patch manufactured by taking the microneedle device 100a as the mold core, the second texture of the microneedle patch is, for example, a spiral curve. (Not shown in the drawings)

In conclusion, according to the microneedle device provided by the present invention, because the surface of the microneedle device has a surface roughness of 0.05-2.0 μm, a film can be formed completely. In addition, in an embodiment, the second surface of each of the microneedle structures has, for example, a surface roughness ranged from 0.05 μm to 2.0 μm, so it is beneficial to enabling the microneedle structure of the microneedle patch to have a good form.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A microneedle device, comprising:
a substrate, having a first surface, wherein the first surface has a surface roughness ranged from 0.05 μm to 2.0 μm; and
a plurality of microneedle structures, arranged on the first surface;
wherein the first surface has a first texture, the first texture comprises a plurality of first patterns, and each of the first patterns encircles each of the microneedle structures;
each of the first patterns has a plurality of circles, each of the circles has a center of a circle, the centers of circles are arranged along a circular trace encircling each of the microneedle structures, and the circles adjacent to each other are overlapped with each other; and
there is a gap ranged from 0.01 mm to 0.2 mm between the centers of circles of the circles adjacent to each other.

2. The microneedle device according to claim 1, wherein each of the microneedle structures has a second needle-like surface, and the second needle-like surface has a surface roughness ranged from 0.05 μm to 2.0 μm.

3. The microneedle device according to claim 2, wherein the second needle-like surface has a second texture; the second texture comprises a plurality of curves, and the curves are arranged in a direction away from the first surface from a side close to the first surface.

4. The microneedle device according to claim 3, wherein there is a gap ranged from 0.01 mm to 0.2 mm between the curves adjacent to each other.

5. The microneedle device according to claim 2, wherein the second needle-like surface has a second texture, the second texture has a curve, and the curve encircles the second needle-like surface in a direction away from the first surface from a side close to the first surface to form a spiral shape.

6. The microneedle device according to claim 1, wherein a material of the substrate and the microneedle structures comprises a metal.

7. The microneedle device according to claim 1, wherein a material of the substrate and the microneedle structures comprises a soluble macromolecular material.

* * * * *